(12) United States Patent
Sun et al.

(10) Patent No.: US 9,805,451 B2
(45) Date of Patent: Oct. 31, 2017

(54) BUILDING MATERIAL CLASSIFICATIONS FROM IMAGERY

(71) Applicant: Hover Inc., Los Altos, CA (US)

(72) Inventors: Shaohui Sun, Mountain View, CA (US); Vineet Bhatawadekar, Mountain View, CA (US); Ioannis Pavlidis, Redwood City, CA (US)

(73) Assignee: HOVER INC., Los Altos, CA (US)

( * ) Notice: Subject to any disclaimer, the term of this patent is extended or adjusted under 35 U.S.C. 154(b) by 155 days.

(21) Appl. No.: 14/749,513

(22) Filed: Jun. 24, 2015

(65) Prior Publication Data

US 2015/0371112 A1 Dec. 24, 2015

Related U.S. Application Data

(60) Provisional application No. 62/016,475, filed on Jun. 24, 2014.

(51) Int. Cl.
*G06K 9/62* (2006.01)
*G06T 5/20* (2006.01)
*G06K 9/00* (2006.01)

(52) U.S. Cl.
CPC ............ *G06T 5/20* (2013.01); *G06K 9/00664* (2013.01)

(58) Field of Classification Search
CPC .... G01C 21/36; G01C 21/3691; G01C 15/00; G01C 11/04
USPC ....... 382/103, 159, 160, 165, 170, 171, 190, 382/209, 278; 348/143, 144, 174
See application file for complete search history.

(56) References Cited

U.S. PATENT DOCUMENTS

| | | | |
|---|---|---|---|
| 6,662,520 B1 * | 12/2003 | Nelson .................. | E04B 1/161 52/474 |
| 6,940,999 B2 * | 9/2005 | Lin ....................... | G06K 9/0063 250/334 |
| 7,006,977 B1 * | 2/2006 | Attra ..................... | G06Q 50/16 705/313 |
| 7,725,209 B2 * | 5/2010 | Menchik ............... | B29C 67/0059 347/86 |
| 7,771,183 B2 * | 8/2010 | Hull ...................... | B29C 67/0077 264/113 |
| 8,078,436 B2 * | 12/2011 | Pershing ............... | G06Q 30/02 703/2 |
| 8,209,152 B2 * | 6/2012 | Pershing ............... | G06F 17/5004 703/1 |
| 8,259,993 B2 * | 9/2012 | Sasakawa ............. | G01C 11/04 382/100 |
| 8,401,222 B2 * | 3/2013 | Thornberry .......... | G06K 9/00637 382/100 |
| 8,417,061 B2 * | 4/2013 | Kennedy ............... | G06K 9/0063 382/282 |
| 8,670,961 B2 * | 3/2014 | Pershing ............... | G06Q 30/02 703/1 |

* cited by examiner

*Primary Examiner* — Yosef Kassa
(74) *Attorney, Agent, or Firm* — Garlick & Markison; Randy W. Lacasse

(57) ABSTRACT

Imagery is used to identify architectural elements that have known architectural patterns. Feature sets associated with a surface and architectural elements in a building model image are compared with known architectural standards of materials to determine the surface building materials and architectural details of a textured building model. In addition, specific texture patterns can assist final material selections for a repair/replacement.

20 Claims, 9 Drawing Sheets

BUILDING MATERIAL CLASSIFICATIONS FROM IMAGERY

CROSS-REFERENCE

The present U.S. Utility Patent Application claims priority pursuant to 35 U.S.C. §119(e) to U.S. Provisional Application No. 62/016,475, entitled "BUILDING MATERIAL CLASSIFICATIONS FROM IMAGERY", filed Jun. 24, 2014, which is hereby incorporated herein by reference in its entirety and made part of the present U.S. Utility Patent Application for all purposes.

INCORPORATION BY REFERENCE

This application also makes reference to U.S. Utility application Ser. No. 13/624,816, entitled "THREE-DIMENSIONAL MAP SYSTEM", filed Sep. 21, 2012, issued as U.S. Pat. No. 8,878,865 on Nov. 4, 2014; U.S. Utility application Ser. No. 12/265,656, entitled "METHOD AND SYSTEM FOR GEOMETRY EXTRACTION, 3D VISUALIZATION AND ANALYSIS USING ARBITRARY OBLIQUE IMAGERY", filed Nov. 5, 2008, issued as U.S. Pat. No. 8,422,825 on Apr. 16, 2013, which are hereby incorporated herein by reference in their entirety and made part of the present U.S. Utility Patent Application for all purposes.

BACKGROUND

Technical Field

The technology described herein relates generally to a system and method for classifying building materials from imagery, and in particular to a system and method using imagery to classify building materials for a building model.

Description of Related Art

Location-based technologies and mobile technologies are often considered the center of the technology revolution of this century. Essential to these technologies is a way to best present location-based information to devices, particularly mobile devices. The technology used to represent this information has traditionally been based on a two-dimensional (2D) map.

Some efforts have been made to generate three-dimensional (3D) maps of urban cities with accurate 3D textured models of the buildings via aerial imagery or specialized camera-equipped vehicles. However, these 3D maps typically have limited texture resolution, geometry quality and are expensive, time consuming and difficult to update and provide no robust real-time image data analytics for various consumer and commercial use cases.

Accurate textured 3D building models provide opportunities to extract visual information from various faces/sections of the textured 3D building model.

DETAILED DESCRIPTION

Figure 1:
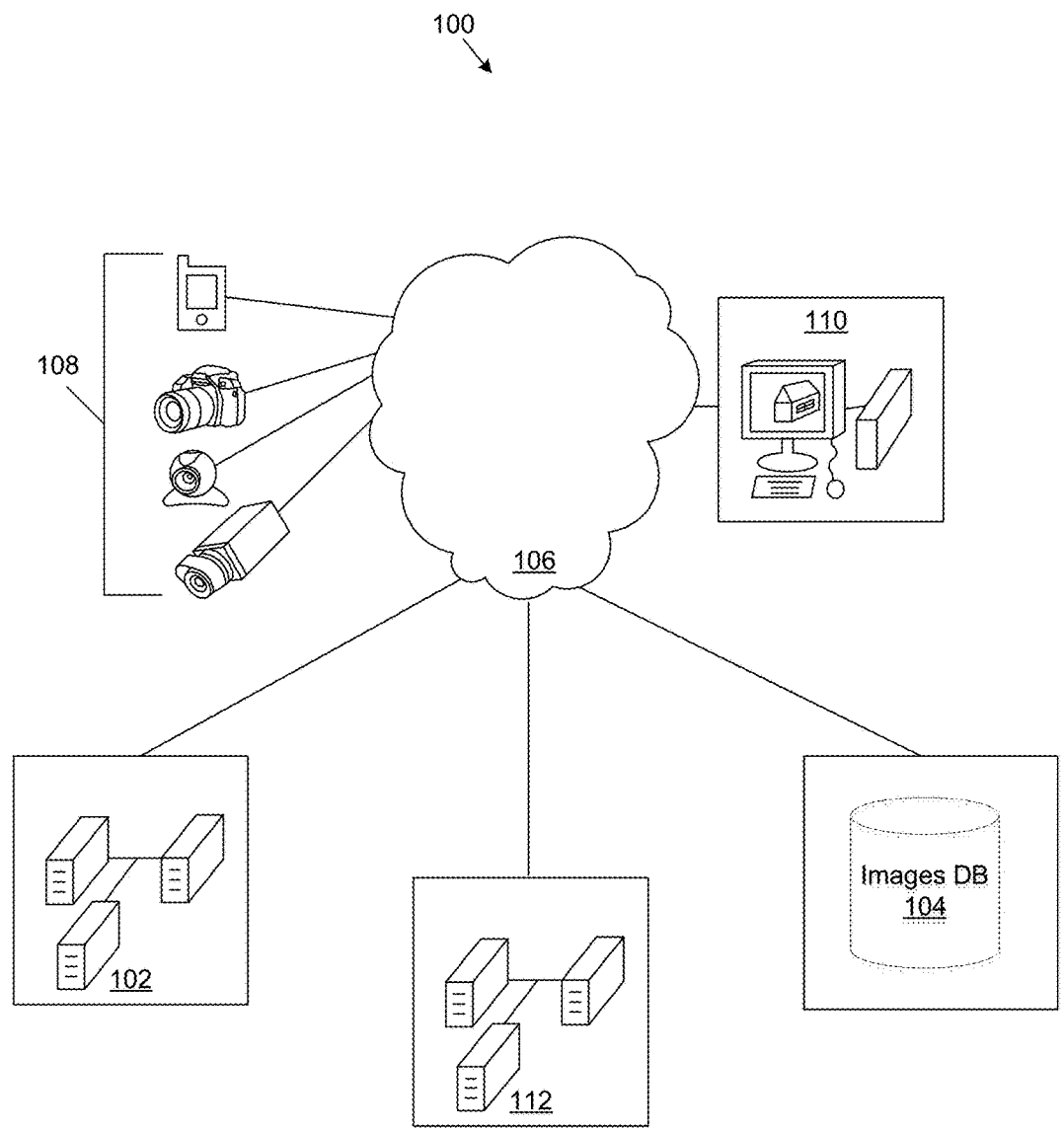
FIG. 1 illustrates one embodiment of a system architecture in accordance with the present disclosure.

FIG. 1 illustrates one embodiment of 3D building model system architecture in accordance with the present disclosure. In one embodiment, image processing system 100 includes image processing servers 102. Image database (DB) 104 and image processing servers 102 are coupled via network channel 106.

Network channel 106 is a system for communication. Network channel 106 includes, for example, an Ethernet or other wire-based network or a wireless NIC (WNIC) or wireless adapter for communicating with a wireless network, such as a WI-FI network. In other embodiments, network channel 106 includes any suitable network for any suitable communication interface. As an example and not by way of limitation, network channel 106 can include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, network channel 106 can be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, network channel 106 uses standard communications technologies and/or protocols. Thus, network channel 106 can include links using technologies such as Ethernet, 802.11, worldwide interoperability for microwave access (WiMAX), 3G, 4G, CDMA, digital subscriber line (DSL), etc. Similarly, the networking protocols used on network channel 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). In one embodiment, data exchanged over network channel 106 is represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

In one or more embodiments, image processing servers 102 include suitable hardware/software in the form of circuitry, logic gates, and/or code functions to process any of orthogonal, oblique and/or ground-level images to include, but not limited to, geo-referencing and calculation of one or more image measurements according to a geo-referenced orthogonal image. Capture device(s) 108 is in communication with image processing servers 102 for collecting images of building objects. Capture devices 108 are defined as electronic devices for capturing images. For example, the capture devices include, but are not limited to: a camera, a phone, a smartphone, a tablet, a video camera, a security camera, mobile camera, vehicle-based camera, aerial cameras, plane based cameras, satellites, a closed-circuit television camera, a computer, a laptop, a webcam, wearable camera devices, photosensitive sensors, equivalents or any combination thereof.

Image processing system 100 also provides for viewer device 110 that is defined as a display device. For example, viewer device 110 can be a computer with a monitor, a laptop, a touch screen display, a smartphone display, a tablet display, an LED array, a television set, a projector display, a wearable heads-up display of some sort, or any combination thereof. In one or more embodiments, the viewer device includes display and interfacing with one or more building features such as facades, façade elements and/or roofing elements. The façade elements include, but are not limited to, associated measurements, architectural elements and building material features. For example, a mobile device, a conventional desktop personal computer has input devices such as a mouse, keyboard, joystick, or other such input devices enabling the input of data and interaction with the displayed images and associated façade elements.

In one example embodiment, images of a physical building are uploaded to image processing system 100 from a capture device. An uploaded image is, for example, a digital photograph of a physical building showing one or more façades (sides/top) of the physical building. For yet another example, the uploaded image is a digital photograph of a physical building showing a side (or top) of the physical building having a single surface type (e.g., siding, brick, stone, shingles, stucco, etc.). Image processing system 100 is used to generate accurately textured, geo-referenced 3D building models based on the collected images. The textured, geo-referenced 3D building models are generated using systems and methods, for example, as provided in U.S. Pat. No. 8,878,865 and U.S. Pat. No. 8,422,825 and hereby incorporated by reference. While various embodiments are described using a 3D environment, a 2D environment can be used to implement the various embodiments of the present disclosure without departing from the scope thereof.

In one embodiment, image processing system 100 includes module 112 for generating statistical information using datasets of images. Module 112 uses collections (datasets) of captured images of a physical building object showing a façade/top of the building object having a building material on the various surfaces and generates statistical information related to the façade of the building object. The dataset and statistical information associated with the images within the dataset provide a knowledge base for comparison of other images to be discussed in further detail below.

2D/3D building models will be leveraged to calculate various building materials for extrapolating costs associated with estimations. For example, 2D/3D building models can be used to calculate the area of a building facade to determine the amount of material that will be necessary to repair or replace an existing façade surface. However, in order to extrapolate costs for estimations both area and material type is needed.

In one or more embodiments of the technology described herein, a system and method is provided for classifying building materials from one or more images of a building object. Features extracted from the images provide the information to determine the type of building materials present in the image and, when combined with area measurements of the building facade and known costs per area, provide accurate cost estimations associated with repairing or replacing building facades.

Each of the embodiments described herein employ machine learning to facilitate automating one or more features described herein. For example, machine learning can be used in a training controller to evaluate and select candidate features, known building surfaces, frequencies, modulation schemes, filters, colors, etc. in order to maximize classification efficiency. The embodiments, e.g., in connection with automatically identifying building materials of surfaces of a building, can employ various AI-based schemes for carrying out various embodiments thereof. Moreover, the classifier can be employed to determine a ranking or priority of the each surface of the reviewed images.

A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis. Example directed and undirected model classification approaches include, but are not limited to, naïve Bayes, Bayesian networks, decision trees, neural networks, fuzzy logic models, and probabilistic classification models providing different patterns of independence can be employed. Classification as used herein also is inclusive of statistical regression that is utilized to develop models of likelihood (e.g., siding (most likely) and brick (less likely).

As will be readily appreciated, one or more of the embodiments can employ classifiers that are explicitly trained (e.g., via training data) as well as implicitly trained (e.g., via observing UE behavior, operator preferences, historical information, receiving extrinsic information). For example, module 112 can be configured via learning or training phases within a classifier constructor and feature selection module. Thus, the classifier(s) can be used to automatically learn and perform a number of functions.

FIGS. 2-8 are directed to various embodiments of identifying building surface materials against a known statistical database of previously identified materials. In at least one embodiment, frequency response correlation is used. However, other techniques for uniquely identifying building materials within images used for a building model are within the scope of the technology described herein. In addition, various techniques for building a database of classified building material data points, aggregating the data points into a range of values (buckets), classifying the aggregated data points as a specific building material and then using these ranges to identify various surfaces in images (e.g., ground based) of building models (2D/3D) are considered within the scope of the technology described herein.

Figure 2:
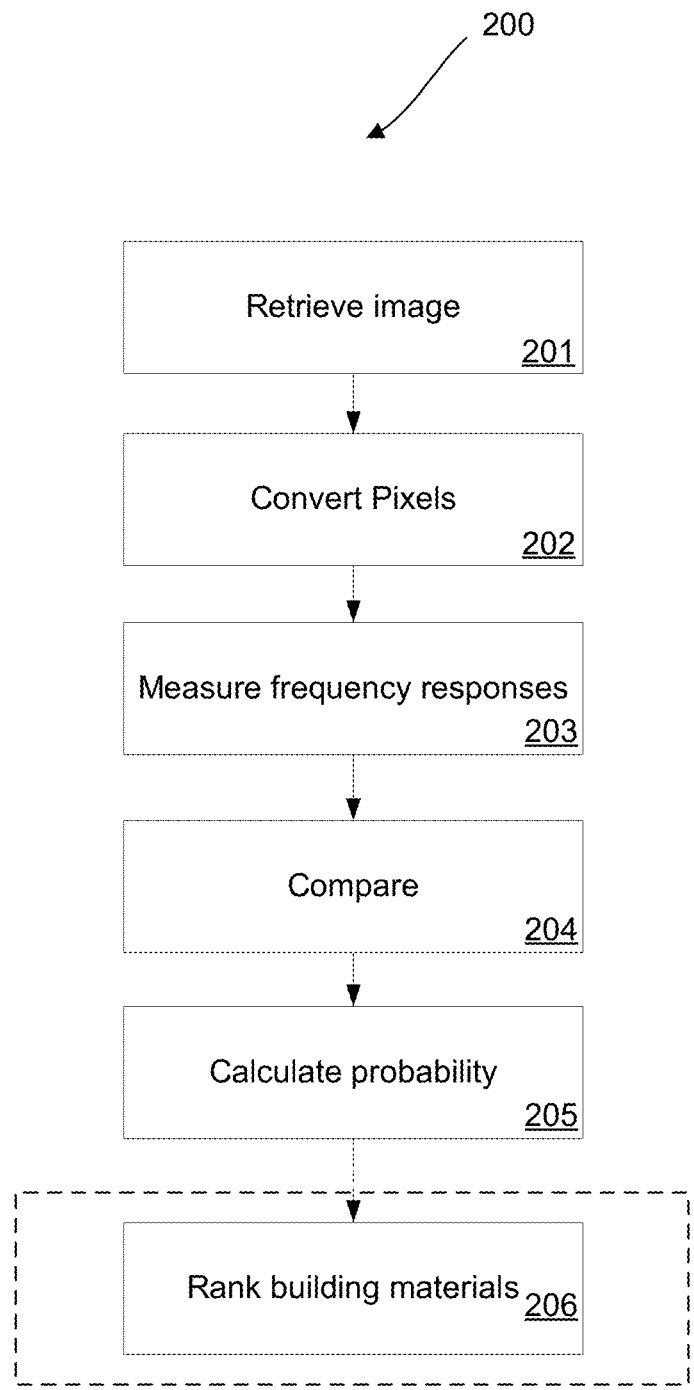
FIG. 2 illustrates a flowchart representing one embodiment process for classifying building materials for an image of a building object.

FIG. 2 illustrates a flowchart representing one embodiment process for classifying building materials for an example image of a building object. Process 200 includes, in step 201, retrieving at least one image used in the generation of a textured 2D/3D building model. In one embodiment, the image includes an entire façade (side) or top of a building object. For example, the image includes all boundary lines (i.e., left and right, top and bottom) for the building object façade. In step 202, features are determined by converting pixel data (e.g., contiguous pixels) of one or more sections of the façade of interest to the frequency domain as discussed in further detail hereafter. In step 203, the converted pixel data is processed to correlate contiguous pixels (sections) with known frequency responses to determine a pattern indicating a type of building material. The converted pixel data is fed through a number of signal filters (e.g., 8 band pass filters (BPFs)) to determine a frequency response correlation which most closely maps to known feature set frequency responses. Typically, lines will describe the outermost edges of a form, as well as dramatic changes of plane within the form. For example, lines represent straight lines of varying features that describe surfaces in a plane and are used to determine relative gradients in an image for particular aspects of an image. Line features such as relative frequency, direction and magnitude (size) can be used to describe surface lines in an image (e.g., a ground-level image) and have a known range of frequency responses (e.g., a library of known material frequency responses stored in memory) as will be described in greater detail hereafter. In addition, specific feature aspects may be used to assist in both building the library of known materials as well as to compare against in future building material analysis. Specific features to assist in recognizing building materials include, but are not limited to, frequency response, location within an image (e.g., front door may be located in center of image), location to another identifiable building feature (multiple windows in a row), feature pitch (may indicate roof and therefore a roofing material), building material patterns, symmetry (may indicate peak of roof), repeated shapes (e.g., windows/doors), height-to-width ratios of contiguous pixels (may indicate doors or windows), percentage of total surface area (e.g. siding may have a higher percentage of total surface area than gutters within the image used for the building model), change in reflected light (may indicate changing surface because of differing materials), texture analysis, density, et al.

An example image of a building object façade that is constructed of brick includes a series of offsetting rows of side-by-side bricks. Each brick has a defined shape with four edges, a left and right edge each perpendicularly connected at a vertex with a top and bottom edge. The rows of brick create long, continuous horizontal lines separating one row from another row. In the vertical direction, the brick layout creates relatively long, discontinuous lines connected perpendicularly with the horizontal lines of the brick rows. Image processing system 100 evaluates the image's building façade to determine a highest probability match of a determined frequency response for a section or the entire façade surface and therefore determines the features associated with the building material.

In step 203, lines associated with brick would form relatively long, straight (vertical and horizontal) and perpendicular lines that define the edges of the bricks of the façade in the image. The typical offset layout of brick patterns provides for long, continuous horizontal lines and shorter, vertical lines perpendicularly intersecting the long, continuous horizontal lines (to be discussed in further detail below). The brick layout provides for predictable lines with predictable frequency responses and therefore establish a known range distinguishing between other building materials (e.g., as opposed to siding). Other building materials will be discussed in further detail later.

In step 204, the length and direction of lines within the contiguous pixel section produces a specific frequency response and is compared against line pattern frequency responses previously generated from known building materials. In one embodiment, module 112 of FIG. 1 uses a training dataset of images to create knowledge for each type of building material. For example, a dataset of 1000 images of building object facades is constructed out of various building materials including brick, stucco, siding and stone. Each image within the dataset is subjected to image processing to determine features for the building material of the building object façade. In various embodiments, the images are evaluated manually, using full automation, with machine learning or a combination thereof, to confirm the building material. Once the features are generated and the building material type has been determined (e.g., by frequency response), the image and meta data (features and building material type) are associated (aggregated in buckets) to create ranges of expected frequency responses (or feature sets) for known materials and stored in module 112. Statistical analysis is performed on the module 112 to correlate determined features with the determined building material of the building object façade. In step 205, the frequency response of one or more sections of a processed image can now be used to determine a probability that features of an image are likely to be attributed to a specific building material of the building object façade.

In one embodiment, the probabilities of the likelihood of the building material being associated with more than one building material are ranked in step 206. For example, if the resolution of an image is poor, it may be difficult to clearly distinguish between siding and brick. In both scenarios, there would be long, continuous horizontal line patterns. However, the perpendicular vertical lines of a brick façade may not be as clear in poor resolution. Therefore, the probability for each type of building material is ranked to determine the most likely building material.

Figure 3:
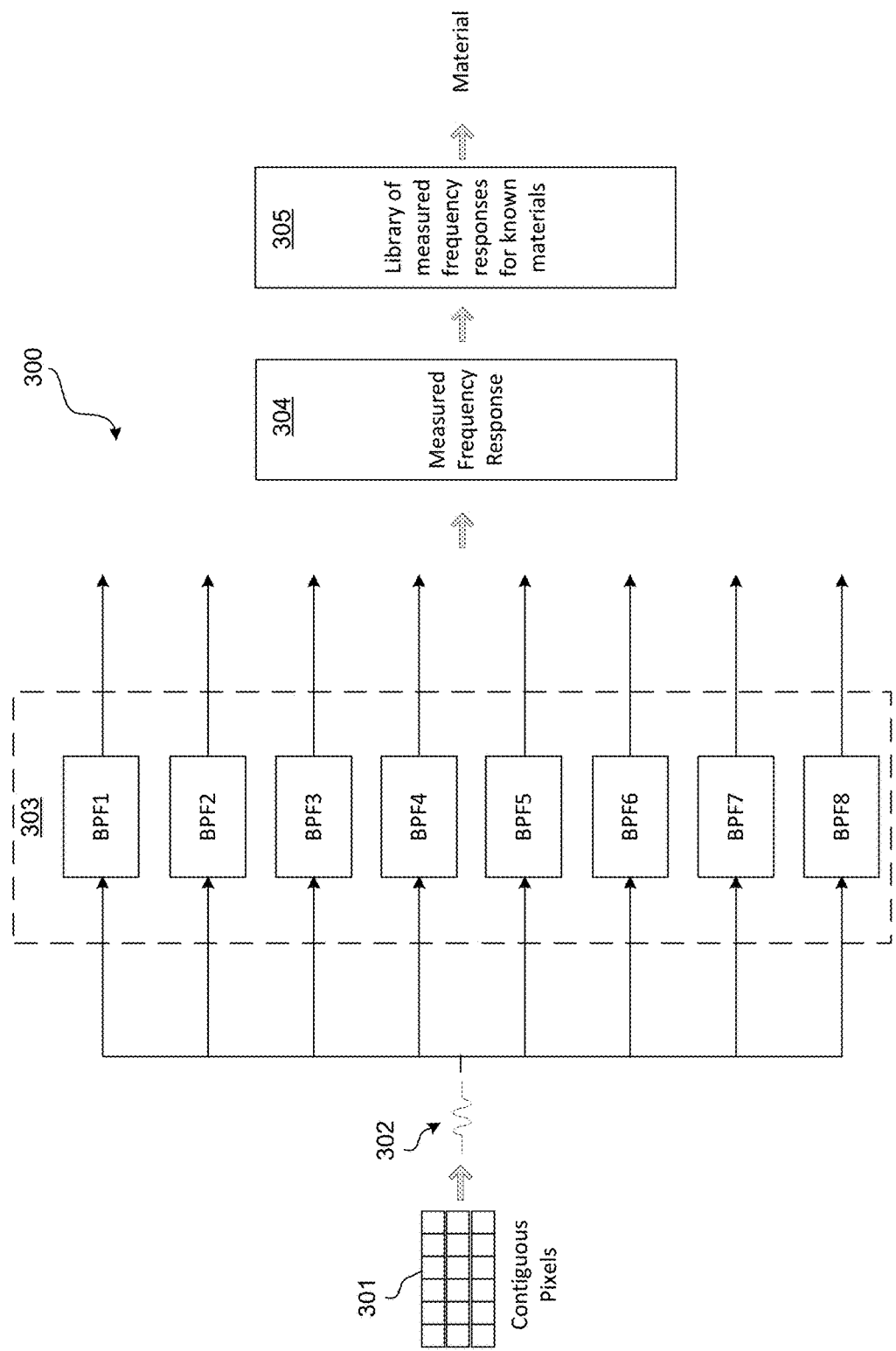
FIG. 3 illustrates a diagram representing one embodiment for classifying building materials for an image of a building object.

FIG. 3 illustrates a diagram 300 representing one embodiment for classifying building materials for an image of a building object. Contiguous pixels 301 include one or more sections of an image (e.g., an entire façade (side) of a building object). For example, the image may include all boundary lines (i.e., left and right, top and bottom) for the building object façade. Features are determined by converting pixel data (e.g., contiguous pixels 301) of one or more sections of the façade of interest to the frequency domain 302. The converted pixel data is fed through a number of signal filters (e.g., as shown, 8 band pass filters (BPFs 303)) to measure a frequency response 304 which most closely maps to a known feature set of frequency responses. Other filters such as low pass and high pass are considered within the scope of the present disclosure. Previously determined frequency responses, for example, a library of known material frequency responses stored in memory 305, are compared against and a ranking of most probable materials produces a candidate building material as an output. The various elements of FIG. 3 may be implemented in one or modules of image processing system 100.

Figure 4:
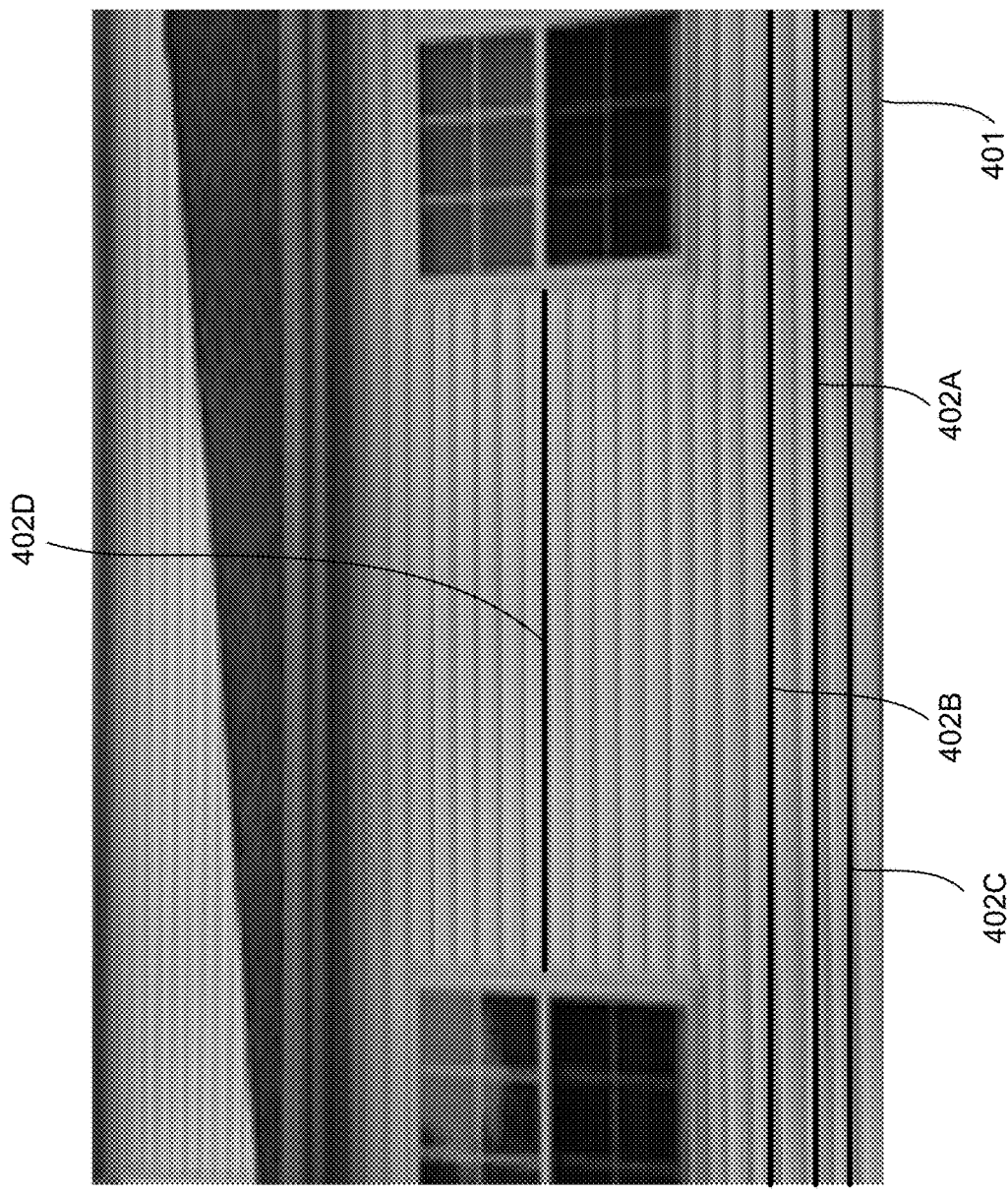
FIG. 4 illustrates an example embodiment for classifying building materials in an image of a building object in accordance with the present disclosure.

FIG. 4 illustrates an example embodiment for classifying building materials in an image of a building object in accordance with the present disclosure. Image 401 provides a partial building façade covered in siding. While shown as a partial image for discussion purposes, a complete image including all boundaries of each façade plane for discovery of building materials as well as area and size determinations is envisioned. Process 200, described in FIG. 2, uses image 401 to determine features associated with sample lines 402A, 402B, 402C and 402D resulting from the analysis of the building material used on the building façade. For example, as previously discussed, a frequency response of a pattern of long, horizontal parallel lines indicates a high probability that the building material in the image is siding when compared to the known similar line pattern frequency responses. FIG. 4 illustrates long horizontal lines 402A, 402B, 402C and 402D; however, the technology described herein is not limited to processing a specific number of lines. In alternative embodiments, a series of images of a single building façade can be provided to increase the probability that the building material is accurately classified (e.g., high resolution ground-level images, images captured from different perspectives, aerial images, etc.).

Figure 5:
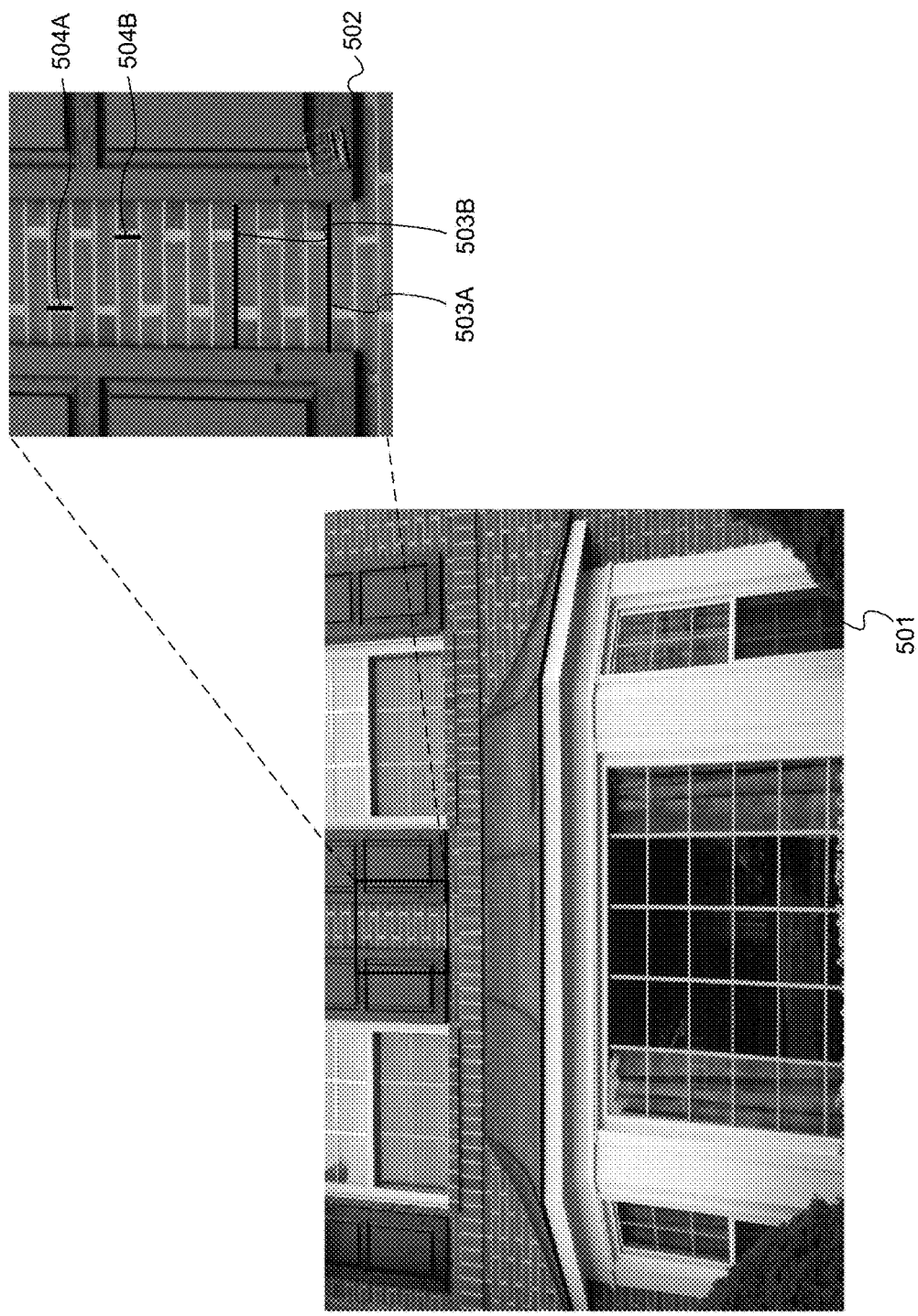
FIG. 5 illustrates another example embodiment for classifying building materials in an image of a building object in accordance with the present disclosure.

FIG. 5 illustrates another example embodiment for classifying building materials in an image of a building object in accordance with the present disclosure. Image 501 provides a partial building façade covered in brick. While shown as a partial image for discussion purposes, a complete image including all boundaries of each façade plane for discovery of building materials as well as area and size determinations is envisioned. Process 200, described in FIG. 2, uses image 501 (section 502) to determine features associated with sample lines 503A, 503B and vertical lines 504A and 504B resulting from the analysis of the building material used on the building façade. In this example embodiment, the frequency responses associated with long, horizontal parallel lines indicate a high probability that the building material in the image is siding or in this case, potentially brick (as they do not traverse the entire façade length) when compared to known frequency response ranges. But, when the frequency responses from the shorter vertical lines are considered, the decision on material type moves from siding to brick (closer overall frequency response match). FIG. 5 illustrates example lines 503A, 503B, 504A and 504B, however, the technology described herein is not limited to processing a specific number of lines. In alternative embodiments, a series of images of a single building façade can be provided to increase the probability that the building material is accurately classified (e.g., high resolution ground-level images, images captured from different perspectives, aerial images, etc.).

Figure 6:
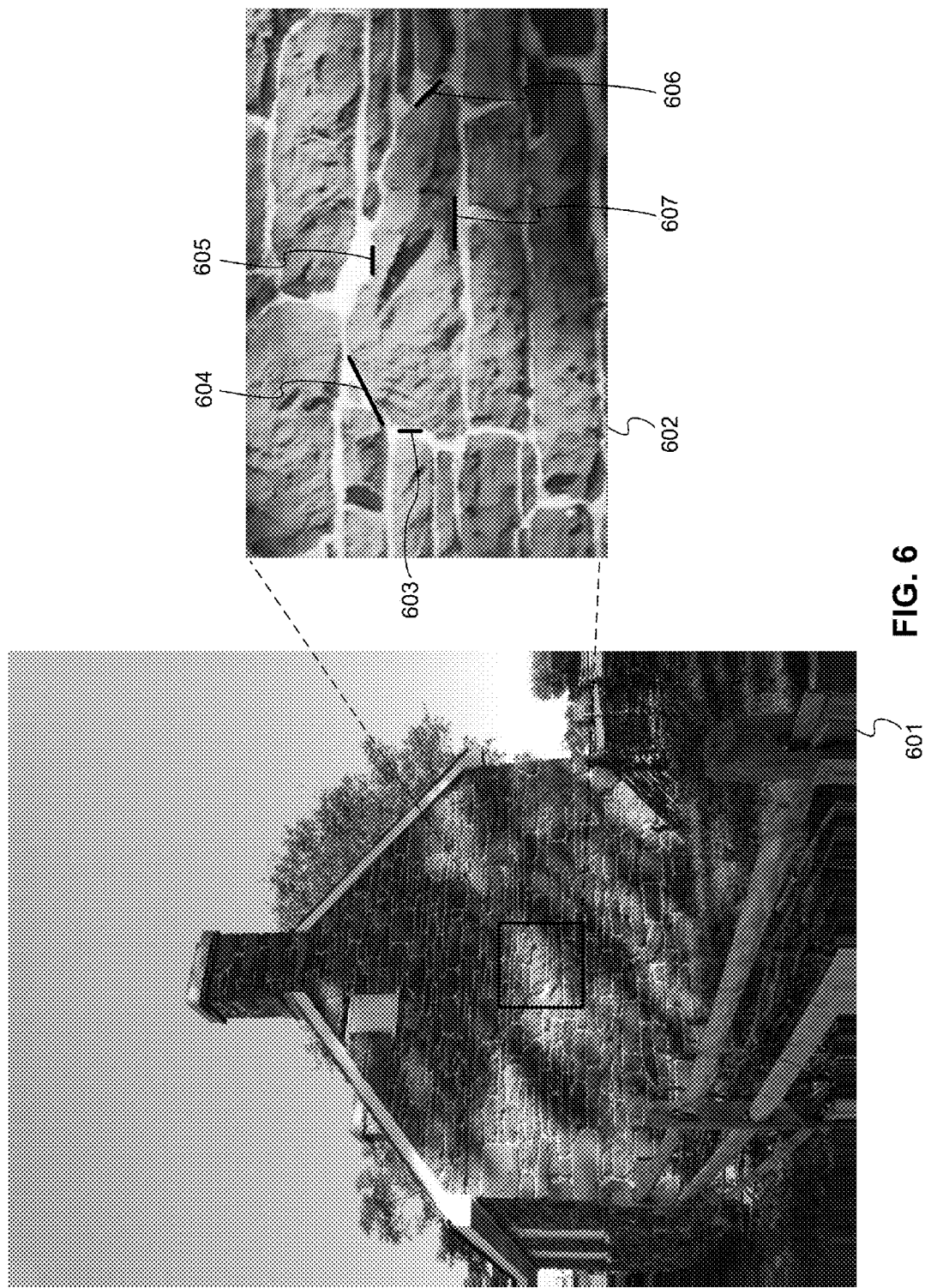
FIG. 6 illustrates another example embodiment for classifying building materials in an image of a building object in accordance with the present disclosure.

FIG. 6 illustrates another example embodiment for classifying building materials in an image of a building object in accordance with the present disclosure. Image 601 provides a partial building façade covered in stone. While shown as a partial image for discussion purposes, a complete image including all boundaries of each façade plane for discovery of building materials as well as area and size determinations is envisioned. Process 200, described in FIG. 2, uses image 601 to determine features associated with sample lines 603-607 resulting from the analysis of the building material used on the building façade. In this example embodiment, the building material results in a frequency response associated with random length and directional lines. These parameters (size, direction, type) are used to compare to known frequency responses of similar line pattern configurations. For example, random length and directional lines indicate a high probability that the building material in the image is stone or some other random pattern material when compared to the frequency responses of known line configurations. FIG. 6 illustrates example lines 603-607; however, the technology described herein is not limited to processing a specific number of lines. In alternative embodiments, a series of images of a single building façade can be provided to increase the probability that the building material is accurately classified (e.g., high resolution ground-level images, images captured from different perspectives, etc.).

Figure 7:
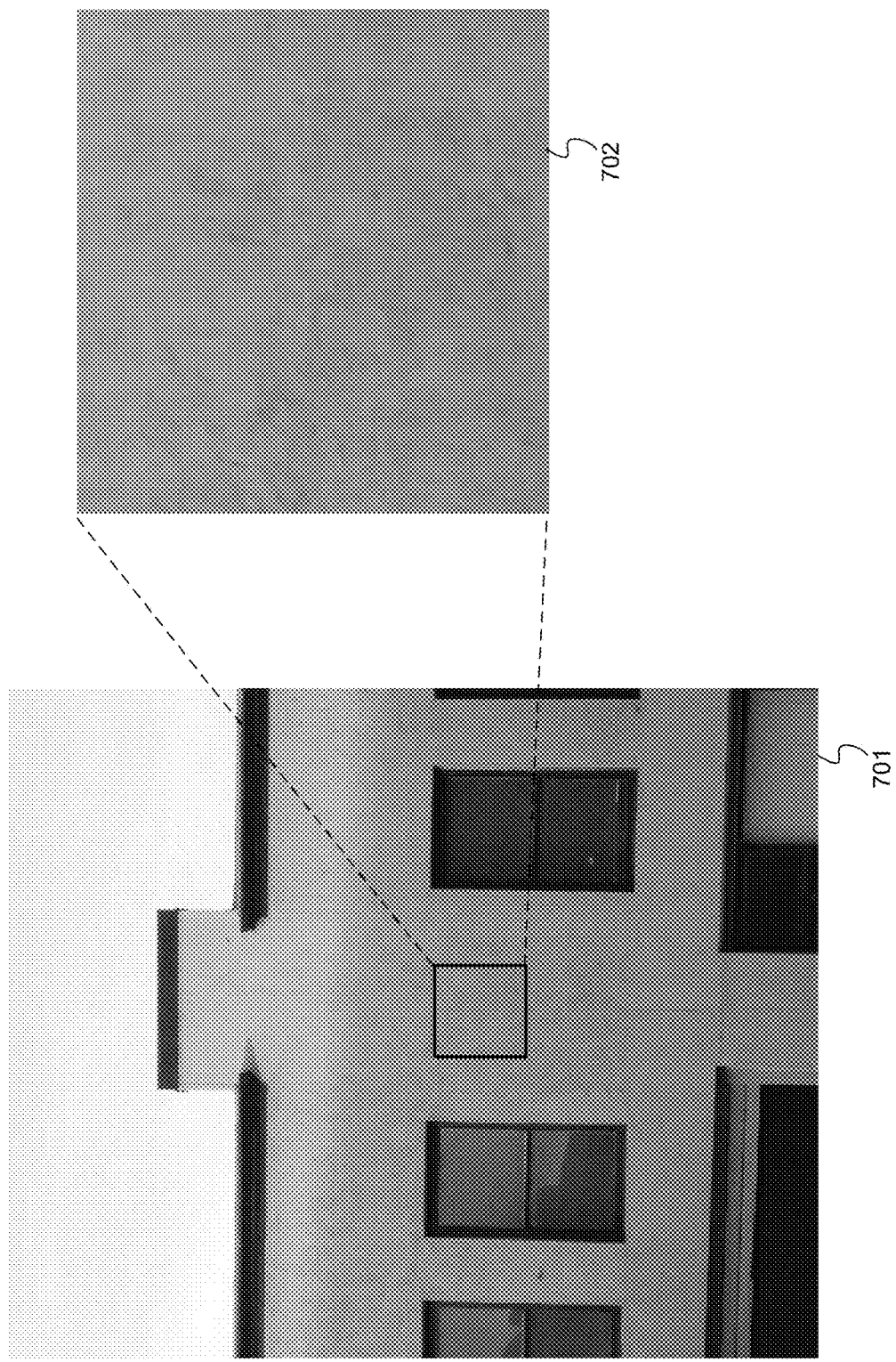
FIG. 7 illustrates another example embodiment for classifying building materials in an image of a building object in accordance with the present disclosure.

FIG. 7 illustrates another example embodiment for classifying building materials in an image of a building object in accordance with the present disclosure. Image 701 provides a partial building façade covered with stucco. While shown as a partial image for discussion purposes, a complete image including all boundaries of each façade plane for discovery of building materials as well as area and size determinations is envisioned. Process 200, described in FIG. 2, uses image 701 (section 702) to generate a frequency response associated with limited or no lines resulting from the analysis of the building material used on the building façade. In this example embodiment, the analysis of the building material frequency responses results in potential selections, including, but not limited to stucco, paint, smooth slate, marble, etc. In this scenario, the building material can be further delineated from a library of known texture or reflective pattern frequency responses (e.g. stucco, paints, marbles, granites, etc.). In alternative embodiments, a series of images of a single building façade can be provided to increase the probability that the building material is accurately classified (e.g., high resolution ground-level images, images captured from different perspectives, aerial imagery, etc.).

As previously described, each the embodiments described herein employ machine learning to facilitate automating one or more features described herein. For example, machine learning can be used in a training controller to evaluate and select candidate features, known building surfaces, frequencies, modulation schemes, filters, colors, etc. in order to maximize classification efficiency.

Figure 8:
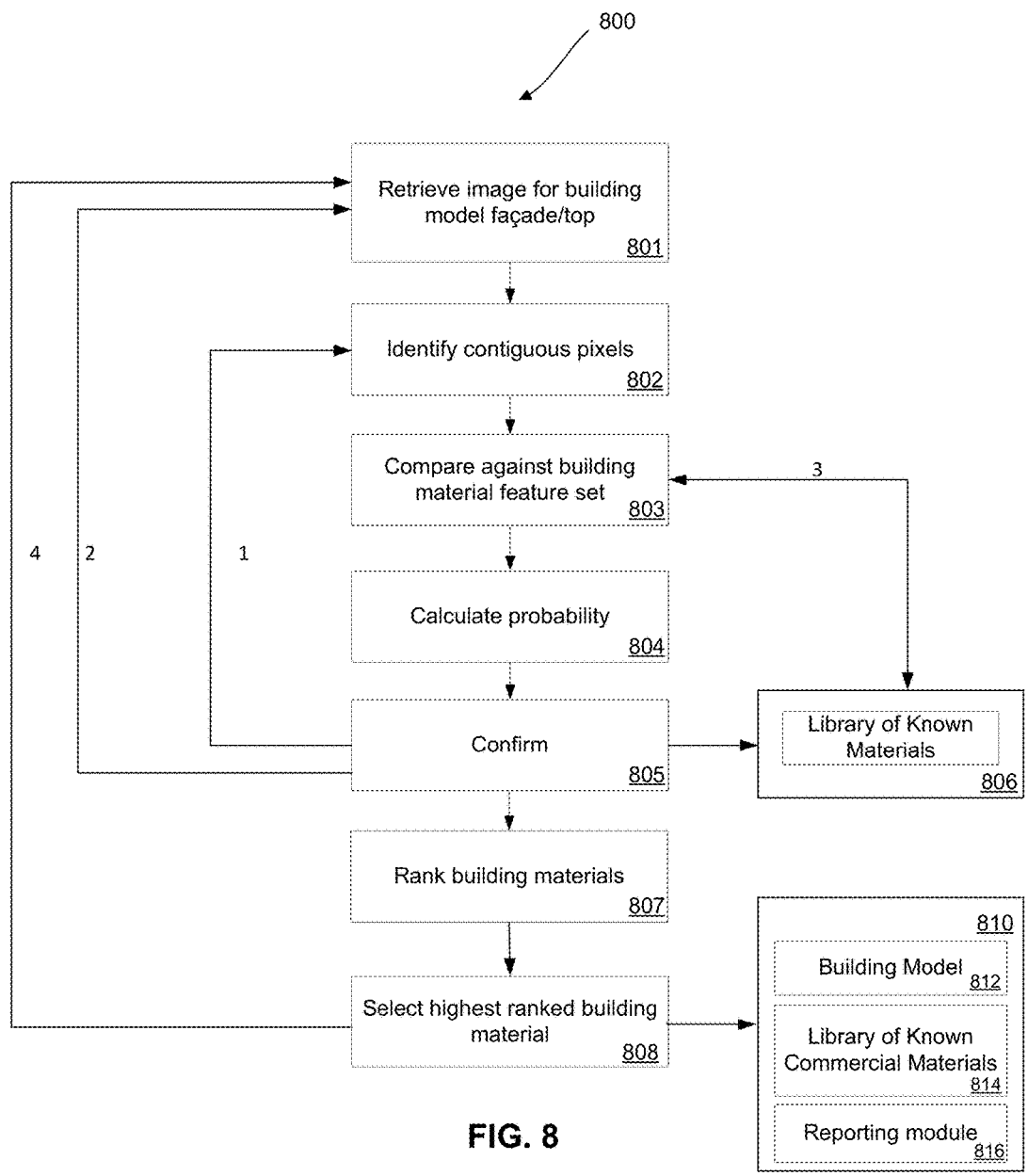
FIG. 8 illustrates a flowchart representing one embodiment process for classifying building materials for an image of a building object.

Referring now to FIG. 8, therein is shown a flow diagram of one embodiment of a machine learning process for determining and classifying building materials. Process 800 is configured to both build a library of known materials as well as compare against the library for future building material identification. While shown as a single process, the training and future identification steps can be performed independently without departing from the scope of the technology described herein.

In step 801, retrieving at least one image used in the generation of a textured 2D/3D building model. In one embodiment, the image includes an entire façade (side) or top of a building object. For example, the image includes all boundary lines (i.e., left and right, top and bottom) for the building object façade. In step 802, features are determined by recognizing contiguous pixel data of a building surface located within of at least one section of the image of interest. In step 803, the contiguous pixel data is processed to correlate contiguous pixels (sections) with known building material feature set data points (located in library of known materials 806) to determine, for example, a pattern indicating a type of building material. In addition, specific feature aspects may be selected from the feature sets to assist in both building the library of known materials 806 as well as to compare against in future building material analysis. Specific features to assist in recognizing building materials include, but are not limited to, frequency response, location within an image (e.g., front door may be located in center of image), location to another identifiable building feature (multiple windows in a row), feature pitch (may indicate roof and therefore a roofing material), material patterns, symmetry (may indicate peak of roof), repeated shapes (e.g., windows/doors), height-to-width ratios of contiguous pixels (may indicate doors or windows), percentage of total surface area (e.g. siding may have a higher percentage of total surface area than gutters within the image used for the building model), change in reflected light (may indicate changing surface because of differing materials), texture analysis, density, et al.

In step 804, a statistical analysis is performed to calculate a probability that a material is a specific building material. For example, contiguous pixels which are of siding may receive a 96% probability that they are siding and 5% that they are glass (windows) based on a comparison to known building material feature sets. In optional step 805, a confirmation of the material either by manual review or machine learning techniques is performed. This step is most advantageously performed in an early training cycle to build the library of known materials. When optional step 805 is not used, workflows 1, 2, 3 and 4 emanate from step 804. Workflow 1 represents repeating for multiple contiguous pixel areas (and potentially, multiple materials). Workflow 2 represents repeating for multiple images. Workflow 3 represents both building and analyzing against the library of known materials. Workflow 4 represents repeating for multiple facades/sides to complete each surface in a building model (2D/3D).

In one embodiment, module 112 of FIG. 1 uses the training dataset of images to create knowledge for each type of building material. For example, a dataset of 1000 images of building object facades is constructed out of various building materials including, but not limited to, brick, stucco, siding, paint, shingles and stone. Each image within the dataset is subjected to image processing to determine features for the building material of the building object façade. In various embodiments, the images are evaluated manually, using full automation, with machine learning or a combination thereof, to confirm the building material. Once the features are generated and the building material type has been determined (e.g., by frequency response), the image and meta data (features and building material type) are associated (aggregated in buckets) to create ranges of expected frequency responses (or feature sets) for known materials and stored in module 112. Statistical analysis is performed on the module 112 to correlate determined features with the determined building material of the building object façade.

In one embodiment, the probabilities of the likelihood of the building material being associated with more than one building material are ranked in step 807. For example, if the resolution of an image is poor, it may be difficult to clearly distinguish between siding and brick. In both scenarios, there would be long, continuous horizontal line patterns. However, the perpendicular vertical lines of a brick façade may not be as clear in poor resolution. Therefore, the probability for each type of building material is ranked to determine the most likely building material.

In step 808, the highest ranked building material (e.g., highest probability) is selected as the building material. This material is fed to building module 810 to be identified on the building model 812 as well as used as a selection from a list of commercial materials 814 (e.g., a specific siding including ordering information, sizing and costs) and output to reporting module 816 to illustrate the building model with associated sizing, costs and/or a purchase list of materials for repairs or replacement.

Figure 9:
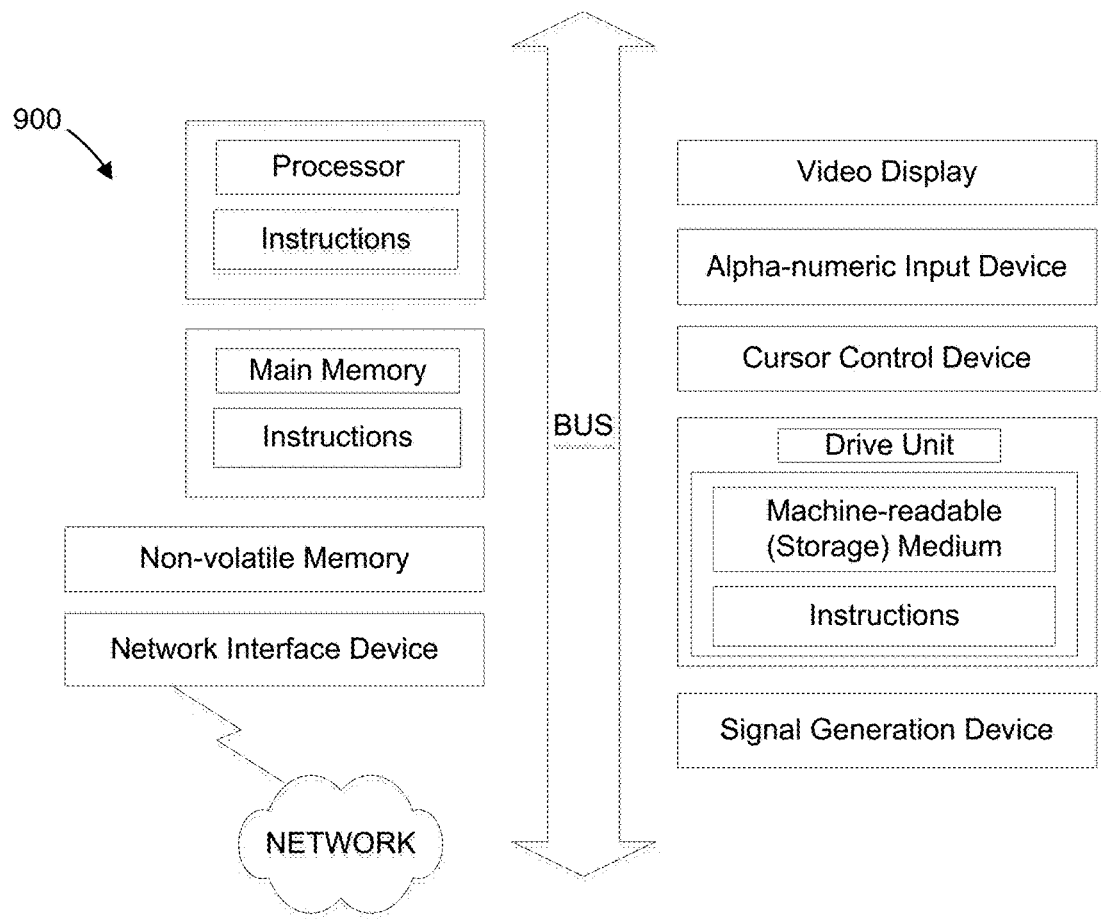
FIG. 9 illustrates a diagrammatic representation of a machine in the example form of a computer system in accordance with the present disclosure.

Referring now to FIG. 9, therein is shown a diagrammatic representation of a machine in the example form of a computer system 900 within which a set of instructions, for causing the machine to perform any one or more of the methodologies or modules discussed herein, may be executed. Computer system 900 includes a processor, memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device and can be located locally or remotely (e.g., in the cloud).

This disclosure contemplates the computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile (non-transitory) memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 900. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the technology as described herein have been expressly described herein, other combinations of these features and functions are likewise possible. For example, the steps may be completed in varied sequences to complete the textured facades. The technology as described herein is not limited by the particular examples disclosed herein and expressly incorporates these other combinations.

What is claimed is:

1. A method of classifying building materials in an image comprising:
   retrieving an image of a building object;
   identifying contiguous pixels;
   comparing the contiguous pixels against a known building material feature set;
   calculating, based on at least the comparing, a probability that the contiguous pixels represent one or more of a plurality of known building materials; and
   determining one of the plurality of known building materials for the identified contiguous pixels of the retrieved image by selecting a highest probability.

2. The method of claim 1 further comprising ranking a result of the calculated probability for the plurality of known building materials.

3. The method of claim 2 further comprising estimating a cost of replacement or repair of the building materials determined by the highest ranked result.

4. The method of claim 1, wherein the plurality of known building materials include any of: siding, brick, stone, paint, glass, wood, shingles or stucco.

5. The method of claim 1, wherein the image is used for building and texturing any of a two dimensional (2D) building model or three dimensional (3D) building model of the building object.

6. The method of claim 1, wherein the image includes any of or a combination of: orthogonal, oblique, aerial, 2D model, 3D model or ground-level.

7. The method of claim 1 further comprising statistics for a plurality of known images.

8. The method of claim 7, wherein the statistics for a plurality of known images are aggregated into buckets to create ranges of expected responses for the known building materials.

9. The method of claim 8, wherein the ranges of expected responses for the known building materials are stored in a library of known materials.

10. The method of claim 1 further comprising repeating the retrieving, identifying, comparing and calculating steps as part of a training routine to a build a library of the known building materials based on the known building material feature set.

11. The method of claim 10 wherein the training routine is performed by machine learning.

12. A system for classifying building materials in an image comprising:
    an image database configured to retrieve an image corresponding to a building object; and
    a processor communicatively coupled to the image database and configured to:
    retrieve an image of the building object;
    identify contiguous pixels;
    compare the contiguous pixels against a known building material feature set;
    calculate, based on at least the compare, a probability that the contiguous pixels represent one or more of a plurality of known building materials; and
    determine one of the plurality of known building materials for the identified contiguous pixels of the retrieved image by selecting a highest probability.

13. The system of claim 12 further comprising a module communicatively coupled to the processor and operable to generate statistics for a plurality of known images.

14. The system of claim 13, wherein the statistics for a plurality of known images are aggregated in buckets to create ranges of expected frequency responses for known materials.

15. The system of claim 12, wherein the processor is further configured to rank the probability for a plurality of the one or more of a plurality of known building materials.

16. The system of claim 15, wherein the processor is further configured to estimate a cost of replacement or repair of the building materials determined by a highest probability for the identified contiguous pixels.

17. The system of claim 12, wherein the plurality of known building materials include one or more of: siding, brick, stone, paint, glass, shingles or stucco.

18. The system of claim 12, wherein the image is used for building and texturing any of a two dimensional (2D) building model or three dimensional (3D) building model of the building object and includes images including any of or a combination of: orthogonal, oblique, aerial or ground-level.

19. The system of claim 12 further comprising repeating the retrieving, identifying, comparing and calculating steps as part of a machine learning training routine to a build a library of the known building materials based on the known building material feature set.

20. A method of classifying building materials in an image comprising:
  retrieving an image of a building object;
  converting contiguous pixels of the retrieved image to frequency domain;
  measuring frequency responses of one or more sections of the image;
  comparing the measured frequency responses against a library of known material frequency responses;
  calculating, based on at least the comparing, a probability that the contiguous pixels represent one of a plurality of known building materials based on the comparing; and
  determining one of the plurality of known building materials for the one or more sections of the retrieved image by selecting a highest probability.

* * * * *